United States Patent [19]

Dahl et al.

[11] Patent Number: 4,933,755
[45] Date of Patent: Jun. 12, 1990

[54] HEAD MOUNTED STEREOSCOPIC TELEVISION VIEWER

[76] Inventors: Thomas R. Dahl, 2156 Montecito Rd., Ramona, Calif. 92065; George Spector, 233 Broadway Room 3815, New York, N.Y. 10007

[21] Appl. No.: 311,039

[22] Filed: Feb. 15, 1989

[51] Int. Cl.⁵ .............................................. H04N 13/00
[52] U.S. Cl. ........................................ 358/88; 358/91
[58] Field of Search ................. 358/88, 3, 236, 91, 358/92

[56] References Cited

U.S. PATENT DOCUMENTS

| | | | |
|---|---|---|---|
| 2,955,156 | 10/1960 | Heilig | 358/88 |
| 4,395,731 | 7/1983 | Schoolman | 358/88 |
| 4,636,866 | 1/1987 | Hattori | 358/236 |
| 4,695,129 | 9/1987 | Faessen et al. | 358/88 |
| 4,706,117 | 11/1987 | Schoolman | 358/88 |
| 4,719,507 | 1/1988 | Bos | 358/88 |
| 4,757,378 | 7/1988 | Hackett, Jr. et al. | 358/88 |
| 4,853,764 | 8/1989 | Sutter | 358/3 |

*Primary Examiner*—John K. Peng

[57] ABSTRACT

A head mounted stereoscopic television viewer is provided and consists of a holding member to be worn on the head of a person, two television receivers for receiving two images of three dimensional video signals, two liquid crystal display units for displaying the two images of three dimensional video signals and a pair of convex lenses positioned between the display panels and eyes of the person to enlarge each image for each eye. The viewer will also include earphones to receive stereo audio signals from the television receivers.

2 Claims, 1 Drawing Sheet

HEAD MOUNTED STEREOSCOPIC TELEVISION VIEWER

BACKGROUND OF THE INVENTION

The instant invention relates generally to individual image display systems and more specifically it relates to a head mounted stereoscopic television viewer.

Numerous individual image display systems have been provided in prior art that are adapted to enable only one person at a time to watch slide, film or television pictures. For example, U.S. Pat. Nos. 4,695,129 and 4,719,507 all are illustrative of such prior art. While these units may be suitable for the particular purpose to which they address, they would not be as suitable for the purposes of the present invention as heretofore described.

SUMMARY OF THE INVENTION

A primary object of the present invention is to provide a head mounted stereoscopic television viewer that will overcome the shortcomings of the prior art devices.

Another object is to provide a head mounted stereoscopic television viewer having an audio signal output, such as a pair of headphones, integral within a holder for a pair of liquid crystal display units to enable a person's access to audio and three-dimensional video signals in an individual manner.

An additional object is to provide a head mounted stereoscopic television viewer so that a person using the viewer will not disturb or interfere with other people located nearby.

A further object is to provide a head mounted stereoscopic television viewer that is simple and easy to use.

A still further object is to provide a head mounted stereoscopic television viewer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
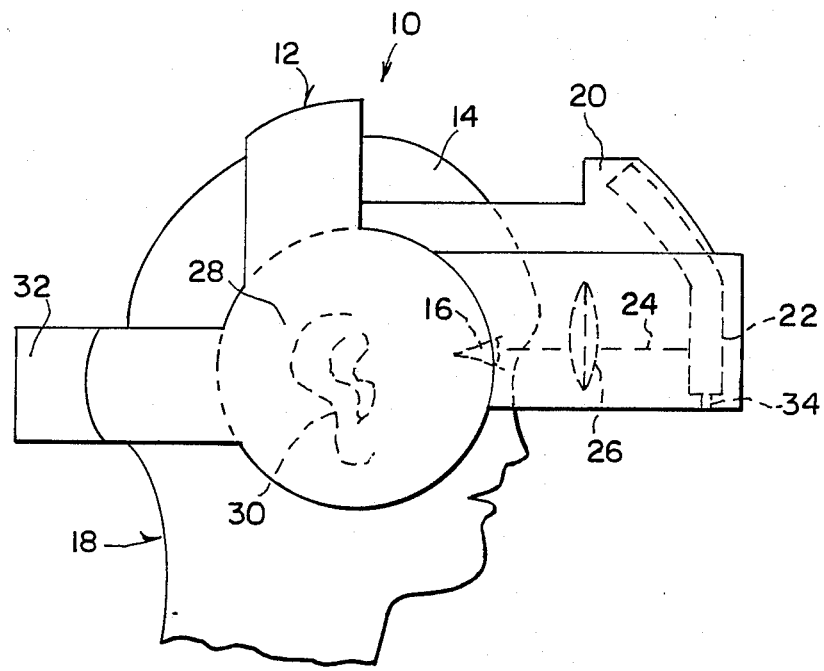
FIG. 1 is a side elevational view of the invention worn by a person.
Figure 2:
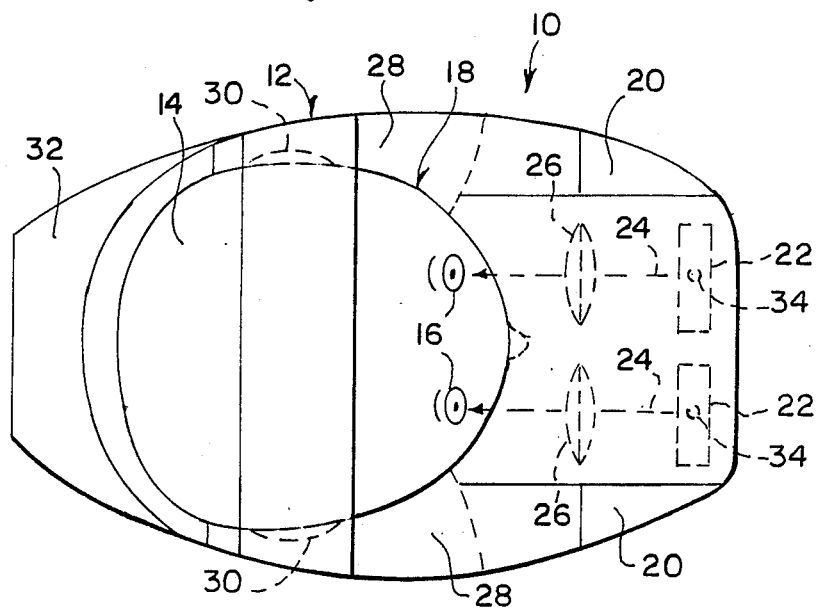
FIG. 2 is a top plan view thereof, showing adjustable LCD units transmitting dissimilar views of the same picture to each eye providing a stereoptic effect.

Turning now descriptively to the drawings, in which similar reference characters denote similar elements throughout the several views, FIGS. 1 and 2 illustrate a head mounted stereoscopic television viewer 10 consisting of a holding member 12 adapted to be worn on the head 14 and around eyes 16 of a person 18. A pair of television receivers 20 are disposed in the holding member 12. One of the receivers 20 is for receiving first image of three dimensional video signal while other of the receivers 20 is for receiving second image of the three dimensional video signals. A pair of liquid crystal display units are disposed in a side by side relationship in the holding member 12. Each of the display units 22 is disposed along line of sight 24, associated with one of the eyes of the person 18 and coupled to one of the receivers to receive one of the images of the three dimensional video signals. A pair of convex lenses 26 are provided. Each of the lenses 26 is disposed in the holding member between one of the respective display units 22 and one of the eyes 16 so as to enlarge size of one of the images displayed on the respective display unit 22.

Each of the television receivers 20 is adapted to receive one portion of stereo audio signals. A pair of earphones 28 are disposed in the holding member 12 adjacent to an ear 30 of the person 18 to receive one of the portions of the stereo audio signals.

A battery pack 32 is carried on the holding member 12 for supplying electrical power to the pair of television receivers 20. Each of the liquid crystal display units 22 is adjustable about a horizontal axis 34 to change angle thereof so as to better position the display units 22 to the eyes 16 of the person 18.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A head mounted stereoscopic television viewer comprising:
   (a) a holding member adapted to be worn on the head and around eyes of a user;
   (b) a pair of symmetrically spaced television receivers, mounted at a front end of said holding member whereby one of said receivers is for receiving first image of three dimensional video signals while other of said receivers is for receiving second image of the three dimensional video signals;
   (c) a pair of liquid crystal display units each extending from said receivers mounted in a side by side symmetric spaced relationship on said holding member each of said display units having a screen disposed along the line of sight, associated with one of the eyes of the user and coupled respectively to each of said receivers to receive one of the images of the three dimensional video signals;
   (d) a pair of convex lenses, each of said lenses mounted on said holding member between one of said respective display units and aligned with one of the eyes so as to enlarge each of the images displayed on said respective display unit;
   (e) each of said television receivers having means for receiving one portion of stereo audio signals and
   (f) a pair of earphones, each of said earphones integrally joined with said holding member adjacent to each ear, further including a battery pack carried on said holding member for supplying electrical power to said pair of television receivers; wherein each of said liquid crystal display units is adjustable about a horizontal axis to change angle thereof so as to better position said display units to the eyes of the person.

2. A device as in claim 1 wherein said holder comprises:

(a) a vertical strap extending over the users head from earphone to earphone;
(b) a rear horizontal retainer extending around the rear of the users head, said battery carried in said retainer and
(c) forward extending viewing bracket holding and receivers display units and lenses; wherein strap, retainer and bracket frame integrally into said earphones.

* * * * *